(12) United States Patent
Fujimoto et al.

(10) Patent No.: US 12,151,779 B2
(45) Date of Patent: *Nov. 26, 2024

(54) SHIFTING SYSTEM FOR HUMAN-POWERED VEHICLE

(71) Applicant: SHIMANO Inc., Sakai (JP)

(72) Inventors: Naoki Fujimoto, Sakai (JP); Takeshi Ueda, Sakai (JP); Tsuyoshi Fukumori, Sakai (JP)

(73) Assignee: Shimano Inc., Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,965

(22) Filed: Apr. 28, 2023

(65) Prior Publication Data

US 2023/0264783 A1 Aug. 24, 2023

Related U.S. Application Data

(60) Continuation of application No. 17/096,017, filed on Nov. 12, 2020, now Pat. No. 11,685,471, which is a
(Continued)

(51) Int. Cl.
| | |
|---|---|
| *F16H 59/14* | (2006.01) |
| *B62M 9/122* | (2010.01) |
| *B62M 9/124* | (2010.01) |
| *B62M 25/08* | (2006.01) |
| *F16H 59/42* | (2006.01) |

(Continued)

(52) U.S. Cl.
CPC ............ *B62M 25/08* (2013.01); *B62M 9/122* (2013.01); *B62M 9/124* (2013.01); *F16H 59/42* (2013.01); *F16H 2059/003* (2013.01); *F16H 59/14* (2013.01); *F16H 2059/147* (2013.01); *F16H 2061/0078* (2013.01);
(Continued)

(58) Field of Classification Search
CPC ...... F16H 59/42; F16H 59/14; F16H 61/0248; F16H 2059/147; F16H 2061/0078; F16H 2061/0223; F16H 2061/0459; B62M 25/08; B62M 9/122; B62M 9/124; B62M 9/123; B62M 9/133
USPC ......................................... 701/56, 57, 60, 66
See application file for complete search history.

(56) References Cited

U.S. PATENT DOCUMENTS

| | | | |
|---|---|---|---|
| 8,768,585 B2 * | 7/2014 | Cheng .................... | B62M 9/123 701/55 |
| 8,886,426 B2 | 11/2014 | Cheng | |

(Continued)

FOREIGN PATENT DOCUMENTS

| | | |
|---|---|---|
| CN | 101391607 A | 3/2009 |
| DE | 102012107939 A1 | 2/2013 |

(Continued)

*Primary Examiner* — Roger L Pang
(74) *Attorney, Agent, or Firm* — Alleman Hall & Tuttle LLP (57) ABSTRACT

A shifting system for a human-powered vehicle comprises a controller. The controller is configured to receive a driving torque and a cadence of the human-powered vehicle from at least one sensor. The controller is configured to determine a permitted shift timing based on the driving torque and the cadence. The controller is further configured to control a shift mechanism to perform a gear shift during the permitted shift timing in accordance with a permitted cadence range and a first threshold of the driving torque.

19 Claims, 5 Drawing Sheets

Related U.S. Application Data division of application No. 16/295,555, filed on Mar. 7, 2019, now Pat. No. 10,875,604.

(51) Int. Cl.
 *F16H 59/00* (2006.01)
 *F16H 61/00* (2006.01)
 *F16H 61/02* (2006.01)
 *F16H 61/04* (2006.01)

(52) U.S. Cl.
 CPC .. *F16H 2061/0223* (2013.01); *F16H 61/0248* (2013.01); *F16H 2061/0459* (2013.01)

(56) References Cited

U.S. PATENT DOCUMENTS

| | | | |
|---|---|---|---|
| 9,234,580 | B1 | 1/2016 | Usui et al. |
| 10,875,604 | B2 * | 12/2020 | Fujimoto ............... B62M 9/122 |
| 10,981,629 | B2 * | 4/2021 | Shahana ................ B62J 45/413 |
| 11,077,915 | B2 * | 8/2021 | Shahana ................ B62J 45/411 |
| 11,685,471 | B2 * | 6/2023 | Fujimoto ............... B62M 9/123 |
| | | | 474/69 |
| 2013/0054067 | A1 | 2/2013 | Shoge et al. |
| 2016/0167738 | A1 | 6/2016 | Fukao et al. |
| 2017/0217538 | A1 * | 8/2017 | Yamamoto ........... B62M 11/145 |
| 2017/0334514 | A1 * | 11/2017 | Chen ........................ B62M 6/55 |
| 2019/0308690 | A1 * | 10/2019 | Terashima ............. B62M 25/08 |

FOREIGN PATENT DOCUMENTS

| | | |
|---|---|---|
| DE | 102015221332 A1 | 6/2016 |
| DE | 102016005211 A1 | 12/2016 |
| TW | 201309539 A | 3/2013 |

\* cited by examiner

FIG. 5

SHIFTING SYSTEM FOR HUMAN-POWERED VEHICLE

CROSS-REFERENCE TO RELATED APPLICATIONS

This application is a continuation of U.S. patent application Ser. No. 17/096,017, filed Nov. 12, 2020 and entitled SHIFTING SYSTEM FOR HUMAN-POWERED VEHICLE, which is a divisional of U.S. patent application Ser. No. 16/295,555, filed Mar. 7, 2019 and entitled SHIFTING SYSTEM FOR HUMAN-POWERED VEHICLE, the entire disclosures of each of which are hereby incorporated by reference for all purposes.

BACKGROUND

Many human-powered vehicles such as bicycles include the ability to shift gears. If a rider of such a vehicle inputs a gear shift command at a poor timing for shifting, then an ideal shifting point on the sprocket can be missed. In this case, shift shock may occur and cause the rider discomfort. While very experienced riders may develop skills for timing the gear shift to avoid shift shock, many other riders lack such skills.

SUMMARY

In accordance with a first aspect of the present invention, a shifting system for a human-powered vehicle comprises a controller. The controller is configured to receive a cadence of the human-powered vehicle from at least one sensor. The controller is configured to control a shift mechanism to perform a gear shift in accordance with a permitted cadence range.

With the shifting system according to the first aspect, it is possible to restrict the gear shift to be performed during the permitted cadence range, thereby improving shift performance.

In accordance with a second aspect of the present invention, the shifting system according to the first aspect is configured in a manner such that the controller is configured to output a command signal for the gear shift to the shift mechanism if the cadence is within the permitted cadence range.

With the shifting system according to the second aspect, it is possible to allow the gear shift to be performed during the permitted cadence range, thereby improving shift performance.

In accordance with a third aspect of the present invention, the shifting system according to the first or second aspect is configured in a manner such that the controller is configured to refrain from outputting the command signal to the shift mechanism if the cadence is determined to be outside the permitted cadence range.

With the shifting system according to the third aspect, it is possible to prevent the gear shift from being performed outside the permitted cadence range, thereby improving shift performance.

In accordance with a fourth aspect of the present invention, the shifting system according to any one of the first through third aspects is configured in a manner such that the controller is configured to receive a driving torque of the human-powered vehicle from at least one sensor.

With the shifting system according to the fourth aspect, it is possible to control the gear shift to be performed in view of the driving torque, thereby improving shift performance.

In accordance with a fifth aspect of the present invention, the shifting system according to the fourth aspect is configured in a manner such that the controller is configured to determine a permitted shift timing based on the driving torque and the cadence.

With the shifting system according to the fifth aspect, it is possible to it is possible to restrict the gear shift to be performed during the permitted shift timing, thereby improving shift performance.

In accordance with a sixth aspect of the present invention, the shifting system according to the fifth aspect is configured in a manner such that the permitted shift timing includes a first timing interval that has a first start and a first end. The controller is configured to control the shift mechanism to perform the gear shift by determining at least one of an estimated travel distance of the shift mechanism and estimated travel speed of the shift mechanism for performing the gear shift, calculating an estimated duration of time that is required for performing the gear shift based on at least one of the estimated travel distance and the estimated travel speed, determining that the gear shift can be commenced after the first start of the first timing interval and completed prior to the first end of the first timing interval, and outputting the command signal to the shift mechanism based on the determination result.

With the shifting system according to the sixth aspect, it is possible to avoid beginning a gear shift that will end after the permitted shift timing, thereby improving shift performance.

In accordance with a seventh aspect of the present invention, the shifting system according to the sixth aspect is configured in a manner such that the estimated travel speed is calculated based on the cadence and the travel distance.

With the shifting system according to the seventh aspect, it is possible to estimate the travel speed without providing means to directly measure the travel speed.

In accordance with an eighth aspect of the present invention, the shifting system according to the sixth aspect is configured in a manner such that the gear shift is one of a plurality of gear shifts, the estimated travel distance is one of a plurality of estimated travel distances, and the estimated travel speed is one of a plurality of estimated travel speeds. The controller is configured to store a map that maps each of the plurality of the gear shifts to an associated one of the plurality of the estimated travel distances and one of the plurality of the estimated travel speeds in a memory. The controller is further configured to determine the at least one of the estimated travel distance and the estimated travel speed for performing the gear shift at least in part by using the map to identify at least one of the estimated travel distance and the estimated travel speed associated with the gear shift.

With the shifting system according to the eighth aspect, it is possible to provide a map of values in advance, thereby shortening the processing time to determine whether the gear shift can be performed within the permitted shift timing.

In accordance with a ninth aspect of the present invention, the shifting system according to the sixth aspect further comprises the shift mechanism including a rear derailleur having a rear chain guide configured for lateral movement over the estimated travel distance in a direction parallel to a rotational axis of a rear sprocket assembly having a plurality of rear sprockets to urge a chain from the one of the rear sprockets to the other of the rear sprockets in the gear shift.

With the shifting system according to the ninth aspect, it is possible to improve shift performance in a rear derailleur.

In accordance with a tenth aspect of the present invention, the shifting system according to the sixth aspect further comprises the shift mechanism including a front derailleur having a front chain guide configured for lateral movement over the estimated travel distance in a direction parallel to a rotational axis of a front sprocket assembly having a plurality of front sprockets to urge a chain from the one of the front sprockets to the other of the front sprockets in the gear shift.

With the shifting system according to the tenth aspect, it is possible to improve shift performance in a front derailleur.

In accordance with an eleventh aspect of the present invention, a shifting system for a human-powered vehicle comprises a controller. The controller is configured to receive a driving torque of the human-powered vehicle from at least one sensor. The controller is configured to control a shift mechanism to perform a gear shift in accordance with a first threshold.

With the shifting system according to the eleventh aspect, it is possible to restrict the gear shift to be performed in accordance with the first threshold, thereby improving shift performance.

In accordance with a twelfth aspect of the present invention, the shifting system according to the eleventh aspect is configured in a manner such that the controller is configured to output a command signal for the gear shift to the shift mechanism if the driving torque is determined to be equal to or greater than the first threshold.

With the shifting system according to the twelfth aspect, it is possible to allow the gear shift to be performed when the driving torque is equal to or greater than the first threshold, thereby improving shift performance.

In accordance with a thirteenth aspect of the present invention, the shifting system according to the eleventh or twelfth aspect is configured in a manner such that the controller is configured to refrain from outputting the command signal to the shift mechanism if the driving torque is determined to be less than the first threshold.

With the shifting system according to the thirteenth aspect, it is possible to prevent the gear shift from being performed when the driving torque is less than the first threshold, thereby improving shift performance.

In accordance with a fourteenth aspect of the present invention, the shifting system according to any one of the eleventh through thirteenth aspects is configured in a manner such that the controller is configured to receive a cadence of the human-powered vehicle from at least one sensor.

With the shifting system according to the fourteenth aspect, it is possible to it is possible to control the gear shift to be performed in view of the cadence, thereby improving shift performance.

In accordance with a fifteenth aspect of the present invention, the shifting system according to the fourteenth aspect is configured in a manner such that the controller is configured to determine a permitted shift timing based on the driving torque and the cadence.

With the shifting system according to the fifteenth aspect, it is possible to it is possible to restrict the gear shift to be performed during the permitted shift timing, thereby improving shift performance.

In accordance with a sixteenth aspect of the present invention, the shifting system according to the fifteenth aspect is configured in a manner such that the permitted shift timing includes a first timing interval that has a first start and a first end. The controller is configured to output a command signal for the gear shift to the shift mechanism if a current timing is between the first start and the first end of the first timing interval.

With the shifting system according to the sixteenth aspect, it is possible to allow the gear shift to be performed during the first timing interval, thereby improving shift performance.

In accordance with a seventeenth aspect of the present invention, the shifting system according to the sixteenth aspect is configured in a manner such that the first start of the first timing interval is a timing at which the driving torque is detected to reach the first threshold as the driving torque is rising in a pedaling cycle, and the first end of the first timing interval is a timing at which the driving torque is detected to reach a second threshold as the driving torque is rising in the pedaling cycle. The second threshold is greater than the first threshold.

With the shifting system according to the seventeenth aspect, it is possible to set the timing interval to begin and end at an appropriate threshold based on whether the driving torque is rising or falling.

In accordance with an eighteenth aspect of the present invention, the shifting system according to the sixteenth aspect is configured in a manner such that the permitted shift timing includes a second timing interval that has a second start and a second end. The controller is configured to control the shift mechanism to perform the gear shift by outputting the command signal for the gear shift to the shift mechanism if the current timing is between the second start and the second end of the second timing interval.

With the shifting system according to the eighteenth aspect, it is possible to allow the gear shift to be performed during a second timing interval, in addition to the first timing interval, thereby allowing different timing intervals to be used for different corresponding circumstances.

In accordance with a nineteenth aspect of the present invention, the shifting system according to the eighteenth aspect is configured in a manner such that the second start of the second timing interval is a timing at which the driving torque is detected to reach the second threshold as the driving torque is falling in the pedaling cycle, and the second end of the second timing interval is a timing at which the driving torque is detected to reach the first threshold as the driving torque is falling in the pedaling cycle.

With the shifting system according to the nineteenth aspect, it is possible to set the timing interval to begin and end at an appropriate threshold based on whether the driving torque is rising or falling.

In accordance with a twentieth aspect of the present invention, the shifting system according to any one of the eleventh to nineteenth aspects is configured in a manner such that the driving torque includes an assist.

With the shifting system according to the twentieth aspect, it is possible to implement the shifting system with a pedelec.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. The term "small and/or light vehicle," as used herein, refers to electric and non-electric vehicles regardless of the number of their wheels, but does not include four-wheeled vehicles having an internal combustion engine as a power source for driving the wheels, or four-wheeled electric vehicles that require a license to operate on public roads.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF EMBODIMENTS

Selected embodiments will now be explained with reference to the drawings, wherein like reference numerals designate corresponding or identical elements throughout the various drawings. It will be apparent to those skilled in the art from this disclosure that the following descriptions of the embodiments are provided for illustration only and not for the purpose of limiting the invention as defined by the appended claims and their equivalents.

Figure 1:
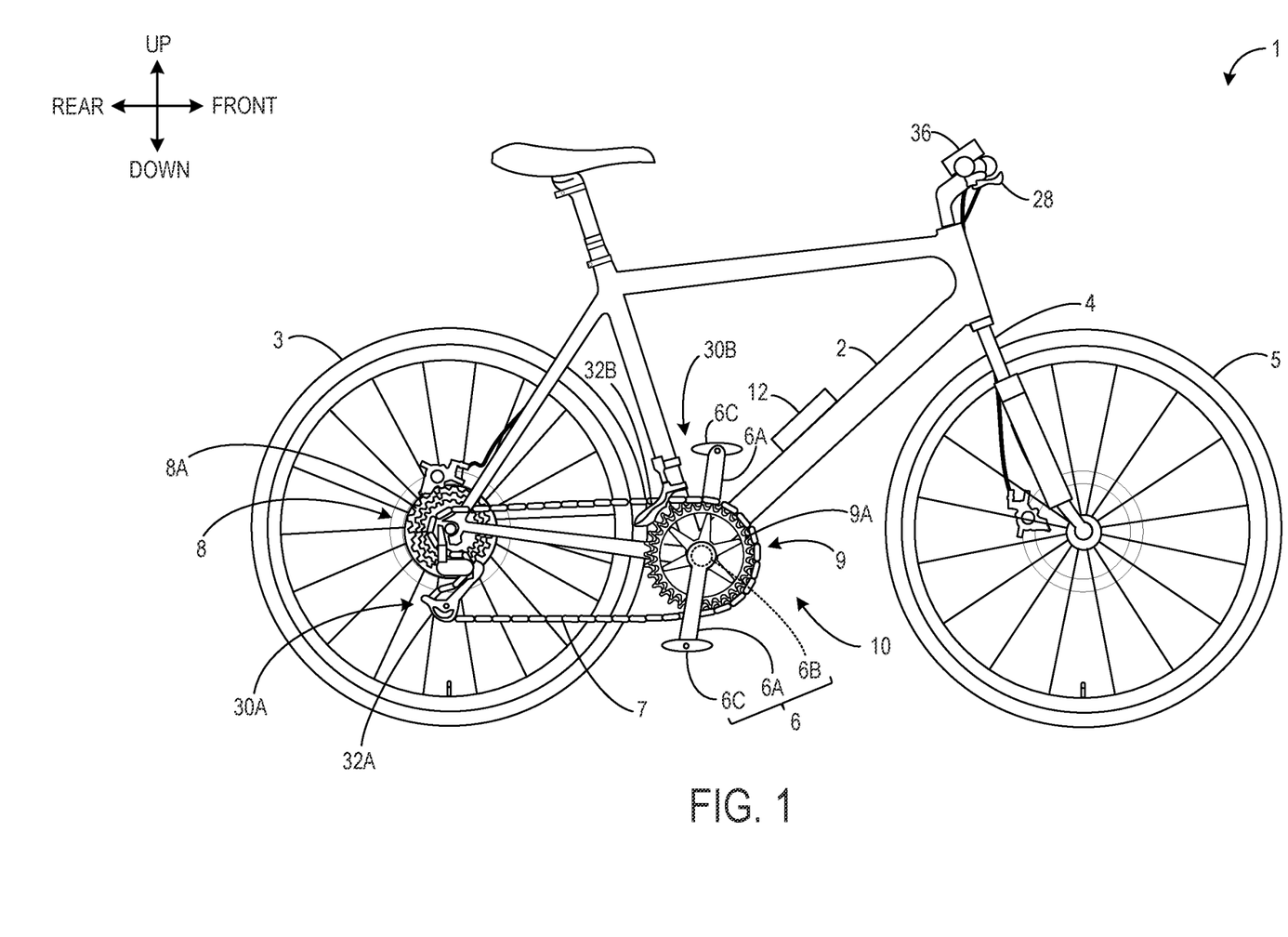
FIG. 1 is a right side elevation view of an example human-powered vehicle incorporating a shifting system according to the present disclosure.

Referring initially to FIG. 1, an exemplary human-powered vehicle 1 having a shifting system 10 in accordance with at least one disclosed embodiment of the present invention is shown. The human-powered vehicle 1 is, for example, a bicycle such as a road bicycle, a mountain bicycle, a cyclocross bicycle, a trekking bicycle, a city bicycle, or a pedelec. The following directional terms "front," "rear," "forward," "rearward," "left," "right," "transverse," "upward," and "downward," as well as any other similar directional terms, refer to those directions which are determined on the basis of a rider sitting upright on a saddle of the human-powered vehicle 1 while facing a handlebar, for example.

Continuing with FIG. 1, the human-powered vehicle 1 includes a frame 2, a rear wheel 3, a front fork 4, a front wheel 5, and a crank assembly 6. The rear wheel 3 is rotatably attached to the frame 2. The front wheel 5 is rotatably attached to the front fork 5. The crank assembly 6 includes a pair of crank arms 6A, a crank axle 6B, and a pair of pedals 6C. The pair of crank arms 6A are mounted on either side of the frame 2 at 180 degrees from one another and are connected by the crank axle 6B. The pair of pedals 6C on either side of the human-powered vehicle 1 are attached to corresponding crank arms 6A. The human-powered vehicle 1 of the present embodiment is driven by a chain drive transmission system that includes a bicycle chain 7, a rear sprocket assembly 8, and a front sprocket assembly 9. The rear sprocket assembly 8 is relatively rotatably mounted to a hub assembly of the rear wheel 3. The rear sprocket assembly 8 includes a plurality of rear sprockets 8A. The front sprocket assembly 9 is attached to the crank assembly 6. The front sprocket assembly 9 includes a plurality of front sprockets 9A. The bicycle chain 7 is engaged with one of the rear sprockets 8A of the rear sprocket assembly 8 and one of the front sprockets 9A of the front sprocket assembly 9. A driving torque applied to the pedals 6C is transferred to the crank arms 6A, which rotate the crank axle 6B and the one of the front sprockets 9A. As the front sprocket assembly 9 rotates, the bicycle chain 7 is driven around one of the front sprockets 9A and transmits power to the rear wheel 3 through the one of the rear sprockets 8A to propel the human-powered vehicle 1. To shift the chain between any of the front sprockets 9A or between any of the rear sprockets 8A, a shifting system 10 of the present invention may be employed. Other components of the human-powered vehicle 1 may be conventional and detailed description thereof is therefore omitted.

Figure 2:
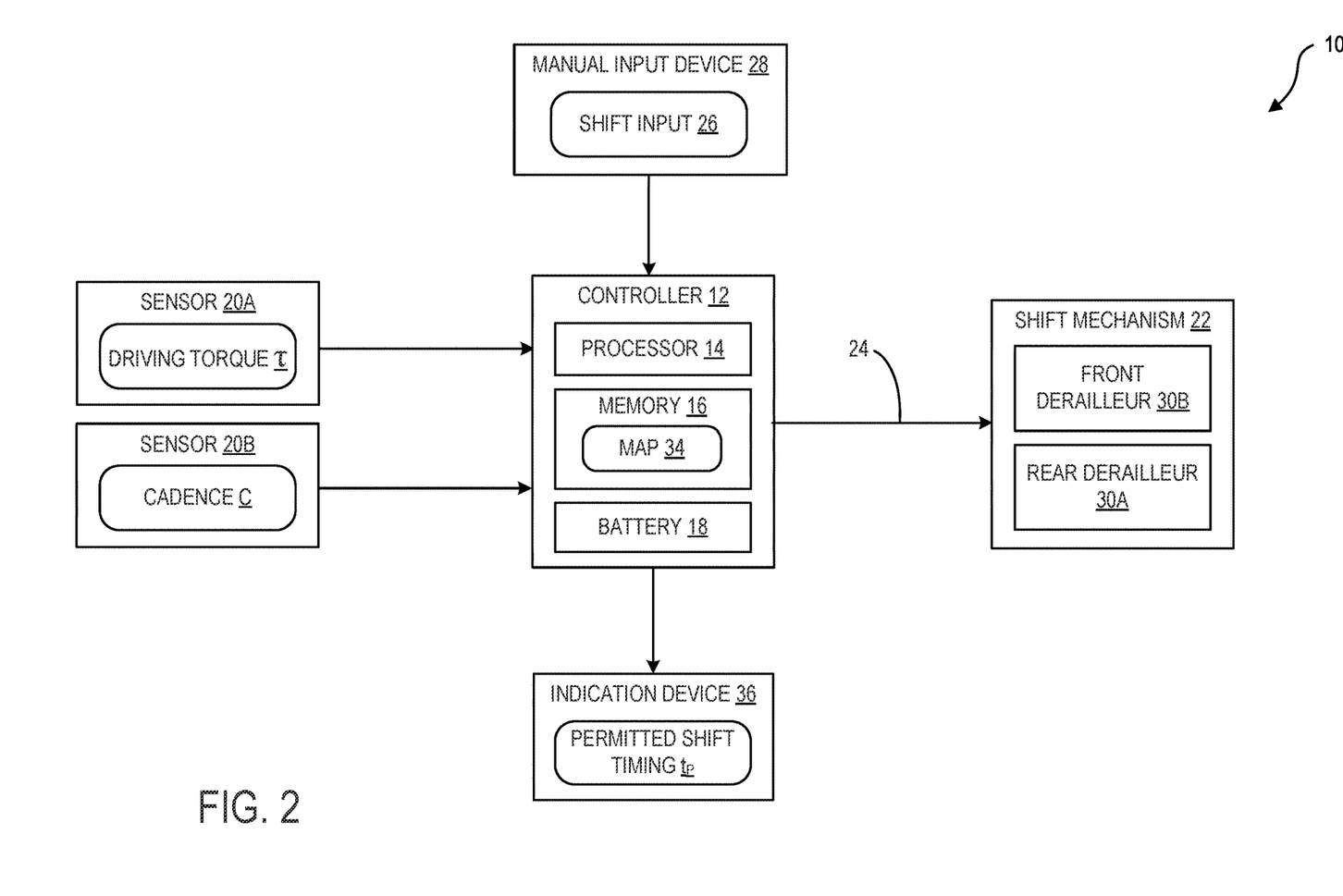
FIG. 2 is a schematic diagram of the shifting system.

FIG. 2 is a schematic diagram of the shifting system 10 for the human-powered vehicle 1. As shown, the shifting system 10 includes a controller 12. The controller 12 may include a processor 14 and memory 16 configured to hold instructions executable by the processor to perform the various functions of the controller 12. The controller 12 may further include a battery 18 to provide electrical power and communication lines to one or more other devices described below. The communication lines may be wired or wireless. While the controller 12 is illustrated in FIG. 1 as being mounted on the frame 2 of the vehicle 1, other suitable locations may be adopted, such as on or near the front or rear sprocket assembly 8 or 9, integrated with a drive assist unit, on the handlebars, etc.

The controller 12 may be configured to receive a driving torque $\tau$ and a cadence C of the human-powered vehicle 1 from at least one sensor. The at least one sensor may be one or more of, for example, a pedal sensor 20A configured to measure the driving torque $\tau$ applied to the pedals 6C by the rider's foot and a crank sensor 20B configured to monitor when the crank arms 6A passes a point along a pedaling cycle, from which the cadence C is measured. In some cases, the sensors 20A, 20B may be combined to a single component which senses both the driving torque $\tau$ and the cadence C. In the case of where the human-powered vehicle 1 is the pedelec, the driving torque $\tau$ may be wholly or partially provided by a driving assist motor. That is, the driving torque $\tau$ may be, or include, an assist torque.

The controller 12 may be configured to determine a permitted shift timing $t_P$ based on the driving torque $\tau$ and the cadence C. Further, the controller 12 may be configured to control a shift mechanism 22 to perform a gear shift during the permitted shift timing $t_P$. Thus, the permitted shift timing $t_P$ may be a torque- and cadence-dependent time at which performance of the gear shift will not result in shift shock, or will result in acceptably low shift shock. Accordingly, the controller 12 may be configured to output a command signal 24 for the gear shift to the shift mechanism 22 if a current timing t is in the permitted shift timing $t_P$. In contrast, the controller 12 may be configured to refrain from outputting the command signal 24 to the shift mechanism 22 if the current timing t is outside the permitted shift timing $t_P$.

Figure 3:
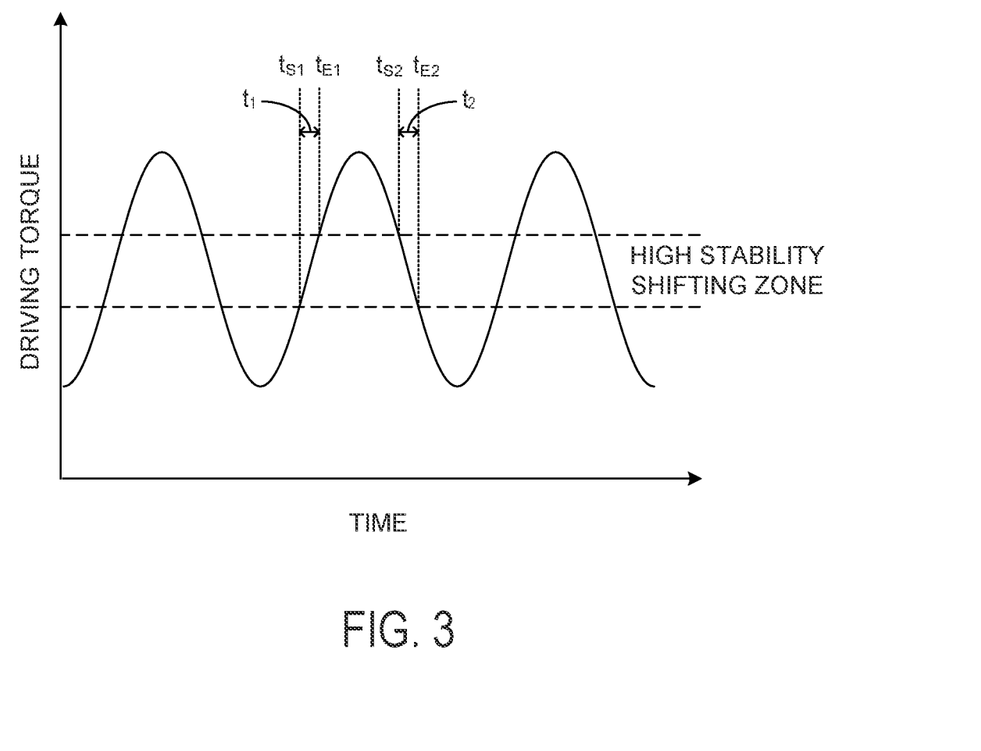
FIG. 3 is a chart illustrating an example of driving torque over time for one pedal of the human-powered vehicle.

FIG. 3 is a chart illustrating an example of driving torque $\tau$ over time for one pedal 6C of the human-powered vehicle 1. Three cycles of the pedal 6C, for example, the right pedal 6C, are shown. It will be appreciated that one or both of the pedals 6C may have the sensor 20A, 20B. As a chart of the left pedal 6C would typically look nearly identical to the chart shown in FIG. 3, but out of phase by 180°, only one chart is provided by way of example.

Using the middle cycle as an example, the permitted shift timing $t_P$ may include a first timing interval $t_1$ that has a first start $t_{S1}$ and a first end $t_{E1}$. As can be seen, the first timing interval $t_1$ lies within a high stability shifting zone where shift shock is absent or minimal. Thus, the controller 12 may be configured to output the command signal 24 for the gear shift to the shift mechanism 22 if the current timing t is between the first start $t_{S1}$ and the first end $t_{E1}$ of the first timing interval $t_1$. Here, the first start $t_{S1}$ of the first timing interval $t_1$ may be a timing at which the driving torque τ is detected to reach a first threshold as the driving torque τ is rising in a pedaling cycle. Further, the first end $t_{E1}$ of the first timing interval $t_1$ may be a timing at which the driving torque τ is detected to reach a second threshold as the driving torque τ is rising in the pedaling cycle. The first threshold may be predetermined and stored in the memory, and the various timing intervals may be determined from recent sensor data such as the driving torque τ correlated with timestamps. In this example, the second threshold is greater than the first threshold because the driving torque τ continues to rise from the first threshold to the second threshold.

In addition, the permitted shift timing $t_P$ may include a second timing interval $t_2$ that has a second start $t_{S2}$ and a second end $t_{E2}$. As with the first timing interval $t_1$, the controller 12 may be configured to control the shift mechanism 22 to perform the gear shift by outputting the command signal 24 for the gear shift to the shift mechanism 22 if the current timing t is between the second start $t_{S2}$ and the second end $t_{E2}$ of the second timing interval $t_2$. As opposed to the first timing interval $t_1$ when the driving torque is rising, the second start $t_{S2}$ of the second timing interval $t_2$ may be a timing at which the driving torque is detected to reach the second threshold as the driving torque τ is falling in the pedaling cycle. Similarly, the second end $t_{E2}$ of the second timing interval $t_2$ may be a timing at which the driving torque τ is detected to reach the first threshold as the driving torque τ is falling in the pedaling cycle.

Returning to FIG. 2, the controller 12 may be configured to receive an input 26 regarding the gear shift. The shifting system 10 may comprise a manual input device 28, the controller 12 being configured to receive the shift input 26 requesting the gear shift via the manual input device 28. Alternatively, an automatic shifting system may be configured to perform the gear shift without receiving the shift input 26 from the manual input device 28. However, in the case where the rider actuates the manual input device 28, the controller 12 may be configured to temporarily hold the command signal 24 in the memory 16 of the controller 12 until the permitted shift timing $t_P$ is reached if the input 26 is received at an input timing that is outside the permitted shift timing $t_P$.

Figure 4:
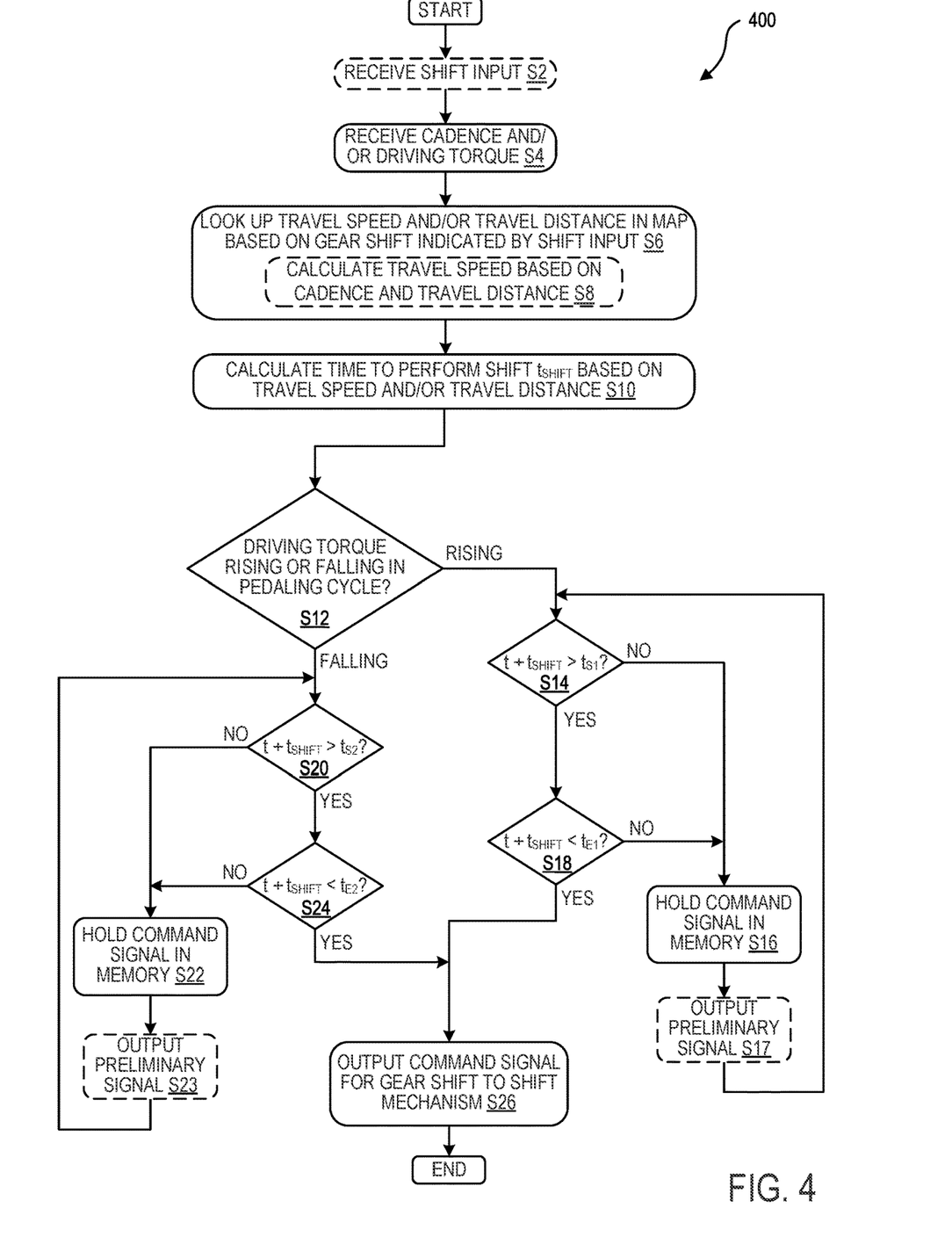
FIG. 4 is a flowchart of a control method performed by the shifting system.

FIG. 4 is a flowchart of a control method 400 performed by the shifting system 10. As discussed above, at step S2, the controller 12 may receive the shift input 26. At step S4, the controller 12 may receive the cadence C and/or the driving torque T. Further, the permitted shift timing $t_P$ may include the first timing interval $t_1$ that has the first start $t_{S1}$ and the first end $t_{E1}$. Generally, at step S6, the controller 12 may be configured to control the shift mechanism 22 to perform the gear shift by determining at least one of an estimated travel distance $D_T$ (see FIG. 5) of the shift mechanism 22 and estimated travel speed of the shift mechanism 22 for performing the gear shift. However, the gear shift may be one of a plurality of gear shifts, the estimated travel distance $D_T$ may be one of a plurality of estimated travel distances $D_T$, and the estimated travel speed may be one of a plurality of estimated travel speeds. In this case, the controller 12 may be configured to store a map 34 that maps each of the plurality of gear shifts to an associated one of the plurality of estimated travel distances $D_T$ and one of the plurality of estimated travel speeds in the memory 16. In some cases, according to step S8, the estimated travel speed may be calculated based on the cadence and the travel distance $D_T$.

Then, at step S10, the controller 12 may calculate an estimated duration of time $t_{SHIFT}$ that is required for performing the gear shift based on at least one of the estimated travel distance $D_T$ and the estimated travel speed. By reading the map 34 in step S6 above, the controller 12 may be configured to determine the at least one of the estimated travel distance $D_T$ and the estimated travel speed for performing the gear shift at least in part by using the map 34 to identify at least one of the estimated travel distance $D_T$ and the estimated travel speed associated with the gear shift.

At step S12, the controller 12 may determine whether the driving torque τ is falling or rising in the pedaling cycle. If the driving torque τ is rising, the controller 12 may determine at step S14 if the time $t_{SHIFT}$ to perform the gear shift added to the current time t is greater than the first start $t_{S1}$. If not, then the command signal 24 is held in the memory 16 at step S16 and the step S14 is repeated later. If the result of step S14 is YES, then at step S18, the controller 12 may determine if the time $t_{SHIFT}$ to perform the gear shift added to the current time t is less than the first end $t_{E1}$. If not, then the command signal 24 is held in the memory 16 at step S16.

Similarly for the case in which the driving torque τ is rising, if the controller 12 determines that the driving torque τ is falling at step S12, then at step S20, the controller 12 may determine if the time $t_{SHIFT}$ to perform the gear shift added to the current time t is greater than the second start $t_{S2}$. If not, then the command signal 24 is held in the memory 16 at step S22 and the step S20 is repeated later. If the result of step S20 is YES, then at step S24, the controller 12 may determine if the time $t_{SHIFT}$ to perform the gear shift added to the current time t is less than the second end $t_{E2}$. If not, then the command signal 24 is held in the memory 16 at step S22.

Alternatively to each step where the command signal 24 is held in the memory 16, the command signal 24 may not be outputted or stored, and the gear shift may instead be prevented from being performed until a new gear shift is requested by either the rider or the automated instructions of a drive assist unit. Further alternatively, the controller 12 may be configured to output a preliminary signal (see optional steps S17 and S23 in FIG. 4) to the shift mechanism 22 to perform a preparation for the gear shift before outputting the command signal 24 temporarily held in the memory 16. For example, a chain guide 32A of a rear derailleur 30A (see FIG. 5) may be moved toward a target chain ring in anticipation of the gear shift without actually performing the gear shift. Finally, once the controller 12 determines that the gear shift can be commenced after the first start $t_{S1}$ of the first timing interval $t_1$ and completed prior to the first end $t_{E1}$ of the first timing interval $t_1$ (YES at step S18 or step S24), the controller 12 may output the command signal 24 to the shift mechanism 22 based on the determination result at step S26.

As discussed above, the shifting system 10 for the human-powered vehicle 1 may comprise the controller 12 configured to receive the cadence C of the human-powered vehicle 1 from the at least one sensor 20A, 20B. In addition, the controller 12 may be configured to control the shift mechanism 22 to perform the gear shift by outputting the command signal 24 for the gear shift if the cadence C is determined to be within a permitted cadence range. The permitted cadence range may be predetermined and stored in the memory 16 in a map similar to the map 34. Further, the permitted cadence range may be dependent on various factors including the driving torque τ or the particular gear shift to be performed, for example. The controller 12 may be configured to control the shift mechanism 22 by refraining from outputting the command signal 24 to the shift mechanism if the cadence C is determined to be outside the permitted cadence range. In particular, the controller 12 may refrain from outputting the command signal 24 if the cadence C is greater than or equal to a first threshold, thus avoiding shifting during fast cycling of the chain rings 9A, 9B. Further, the controller 12 may refrain from outputting the command signal 24 if the cadence C is less than or equal to a second threshold that is lower than the first threshold, thus avoiding shifting during slow cycling of the chain rings 9A, 9B. After refraining, the controller 12 may be configured to output the command signal 24 if the cadence C changes to be within the permitted cadence range, or wait until another gear shift is instructed.

In one implementation, as discussed above, the shifting system 10 for the human-powered vehicle 1 may comprise the controller 12. The controller 12 may be configured to receive the driving torque $\tau$ of the human-powered vehicle 1 from the at least one sensor 20A, 20B. Here, the controller 12 may be configured to control the shift mechanism 22 to perform the gear shift by outputting the command signal 24 for the gear shift if the driving torque $\tau$ is determined to be equal to or greater than a first threshold. Thus, the gear shift may be restricted to times where sufficient driving torque $\tau$ is used to avoid shift shock. Further, the controller 12 may be configured to refrain from performing the gear shift if the driving torque $\tau$ is determined to be less than the first threshold.

Figure 5:
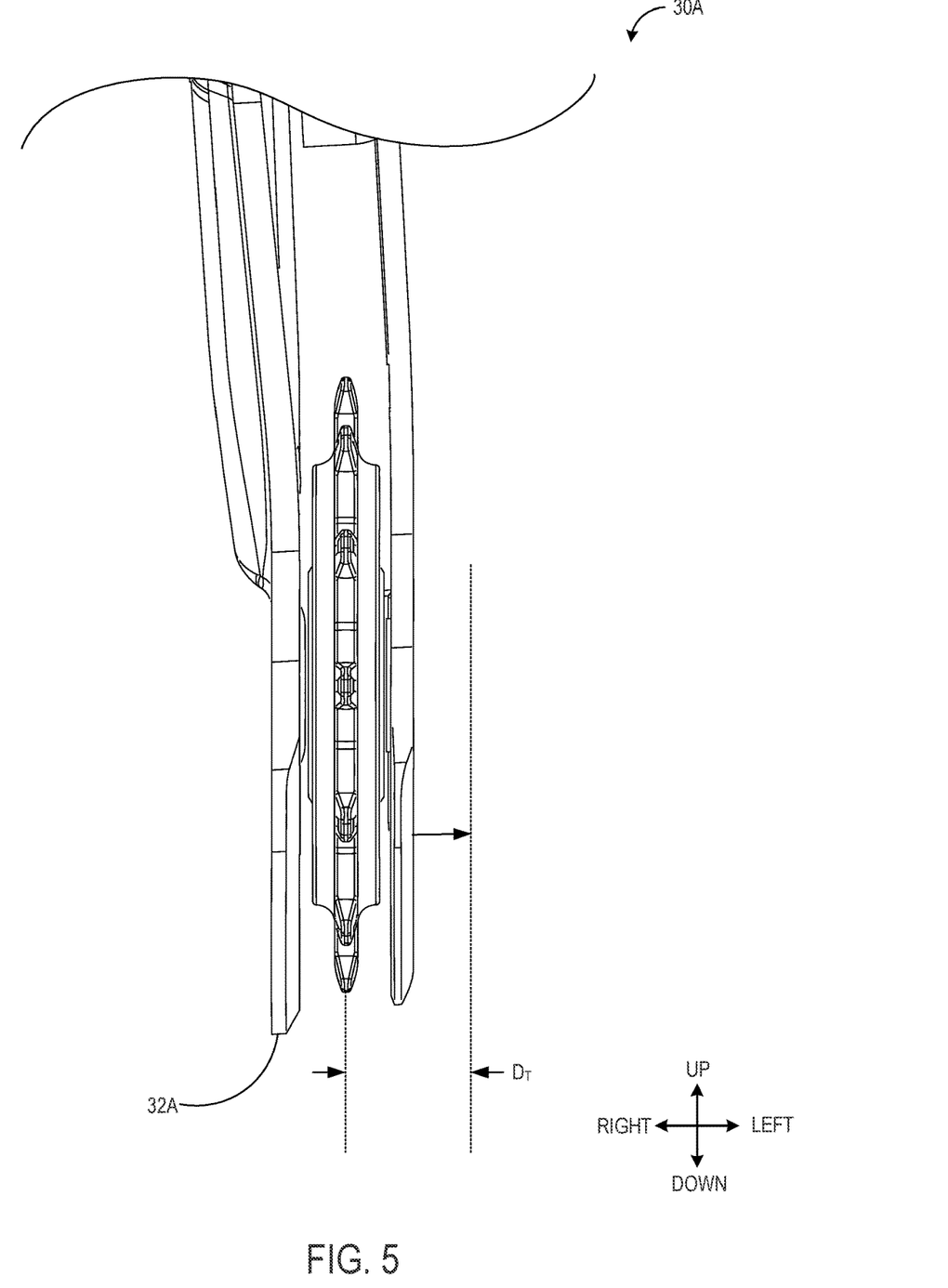
FIG. 5 is a partial front view of an exemplary derailleur of the shifting system.

Returning to FIG. 1, the shifting system 10 may include the shift mechanism 22 including a rear derailleur 30A having a rear chain guide 32A configured for lateral movement over the estimated travel distance $D_T$ in a direction parallel to a rotational axis of the rear sprocket assembly having a plurality of rear sprockets 8A to urge the chain 7 from the one of the rear sprockets 8A to the other of the rear sprockets 8A in the gear shift. Alternatively or in addition, the shifting system 10 may include the shift mechanism 22 including a front derailleur 30B having a front chain guide 32B configured for lateral movement over the estimated travel distance $D_T$ in a direction parallel to a rotational axis of the front gearset having a plurality of front sprockets 9A to urge the chain 7 from the one of the front sprockets 9A to the other of the front sprockets 9A in the gear shift. FIG. 5 is a partial front view of an exemplary derailleur of the shifting system 10. While the rear derailleur 30A is used by way of example, the front derailleur 30B also includes a respective chain guide 32B that is configured for similar lateral movement. Here, the chain guide 32A moves from one dotted line to the other, over the estimated travel distance $D_T$. The direction of the movement is right and left in FIG. 5, which corresponds to a rotational axis (oriented into the page) of the rear sprocket assembly 8 shown in FIG. 1.

In some implementations, the shifting system 10 may include an indication device 36, as shown in FIGS. 1 and 2. The controller 12 may be configured to cause the indication device 36 to indicate the permitted shift timing $t_P$ by at least one of a visual manner, an aural manner, and a haptic manner. Thus, the indication device 36 may be a speaker, display, light, and or vibration unit, for example. While the indication device 36 is illustrated attached to the handlebars of the vehicle 1, it will be appreciated that the indication device 36 may be placed in any suitable location such as on the rider's helmet, on the rider's wrist or other body part, or on the frame 2 of the vehicle 1.

While only selected embodiments have been chosen to illustrate the present invention, it will be apparent to those skilled in the art from this disclosure that various changes and modifications can be made herein without departing from the scope of the invention as defined in the appended claims. For example, the size, shape, location, or orientation of the various components can be changed as needed and/or desired. Components that are shown directly connected or contacting each other can have intermediate structures disposed between them. The functions of one element can be performed by two elements, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

The invention claimed is:

1. A shifting system for a human-powered vehicle, comprising:
    a controller configured to:
        receive an input requesting a gear shift and a driving torque of the human-powered vehicle from at least one sensor;
        permit a shift mechanism to perform the gear shift in a state where the driving torque is equal to or greater than a first threshold; and
        prevent the shift mechanism from performing the gear shift in a state where the driving torque is less than the first threshold.

2. The shifting system according to claim 1, wherein the controller is configured to output a command signal for the gear shift to the shift mechanism if the driving torque is equal to or greater than the first threshold.

3. The shifting system according to claim 2, wherein the controller is configured to refrain from outputting the command signal to the shift mechanism if the driving torque is less than the first threshold.

4. The shifting system according to claim 1, wherein the controller is configured to receive a cadence of the human-powered vehicle from at least one sensor.

5. The shifting system according to claim 4, wherein the controller is configured to control the shift mechanism to perform the gear shift during a permitted shift timing, the permitted shift timing being based on the driving torque and the cadence.

6. The shifting system according to claim 1, wherein the driving torque includes an assist torque.

7. The shifting system according to claim 1, wherein the controller is configured to receive a shift input requesting the gear shift via a manual input device.

8. The shifting system according to claim 7, wherein the controller is configured to permit the shift mechanism to perform the gear shift if the manual input device is actuated by a rider in the state where the driving torque is equal to or greater than the first threshold.

9. The shifting system according to claim 8, wherein the controller is configured to prevent the shift mechanism from performing the gear shift if the manual input device is actuated by the rider in the state where the driving torque is less than the first threshold.

10. A shifting system for a human-powered vehicle, comprising:
a controller configured to:
receive a driving torque of the human-powered vehicle from at least one sensor;
permit a shift mechanism to perform a gear shift in a state where the driving torque is equal to or greater than a first threshold; and
prevent the shift mechanism from performing the gear shift in a state where the driving torque is less than the first threshold, wherein
the controller is configured to receive a cadence of the human-powered vehicle from at least one sensor,
the controller is configured to control the shift mechanism to perform the gear shift during a permitted shift timing, the permitted shift timing being based on the driving torque and the cadence,
the permitted shift timing includes a first timing interval that has a first start and a first end, and
the controller is configured to output a command signal for the gear shift to the shift mechanism if a current timing is between the first start and the first end of the first timing interval.

11. The shifting system according to claim 10, wherein
the first start of the first timing interval is a timing at which the driving torque is detected to reach the first threshold as the driving torque is rising in a pedaling cycle;
the first end of the first timing interval is a timing at which the driving torque is detected to reach a second threshold as the driving torque is rising in the pedaling cycle, and
the second threshold is greater than the first threshold.

12. The shifting system according to claim 10, wherein
the permitted shift timing includes a second timing interval that has a second start and a second end, and
the controller is configured to control the shift mechanism to perform the gear shift by outputting the command signal for the gear shift to the shift mechanism if the current timing is between the second start and the second end of the second timing interval.

13. The shifting system according to claim 12, wherein
the second start of the second timing interval is a timing at which the driving torque is detected to reach a second threshold as the driving torque is falling in a pedaling cycle, and
the second end of the second timing interval is a timing at which the driving torque is detected to reach the first threshold as the driving torque is falling in the pedaling cycle.

14. A shifting system for a human-powered vehicle, comprising:
a controller configured to:
receive a driving torque of the human-powered vehicle from at least one sensor; and
control a shift mechanism to perform a gear shift during a permitted shift timing, the permitted shift timing being based on the driving torque, wherein
the permitted shift timing includes a first timing interval that has a first start and a first end, and
the controller is configured to output a command signal for the gear shift to the shift mechanism if a current timing is between the first start and the first end of the first timing interval.

15. The shifting system according to claim 14, wherein
the controller is configured to refrain from outputting the command signal to the shift mechanism if the current timing is outside the permitted shift timing.

16. The shifting system according to claim 14, wherein
the controller is configured to receive a cadence of the human-powered vehicle from at least one sensor, the permitted shift timing being based on the driving torque and the cadence.

17. The shifting system according to claim 14, wherein the driving torque includes an assist torque.

18. A shifting system for a human-powered vehicle, comprising:
a controller configured to:
receive a driving torque of the human-powered vehicle from at least one sensor;
permit a shift mechanism to perform a gear shift in a state where the driving torque is equal to or greater than a first threshold; and
prevent the shift mechanism from performing the gear shift in a state where the driving torque is less than the first threshold, wherein
the controller is configured to receive a shift input requesting the gear shift via a manual input device, and
the controller is configured to permit the shift mechanism to perform the gear shift if the manual input device is actuated by a rider in the state where the driving torque is equal to or greater than the first threshold.

19. The shifting system according to claim 18, wherein
the controller is configured to prevent the shift mechanism from performing the gear shift if the manual input device is actuated by the rider in the state where the driving torque is less than the first threshold.

* * * * *